Sept. 27, 1932. A. ANDERBERG ET AL 1,878,993
COMPRESSED AIR BRAKE FOR OBTAINING A VARIABLE BRAKING EFFECT
Filed Feb. 14, 1930
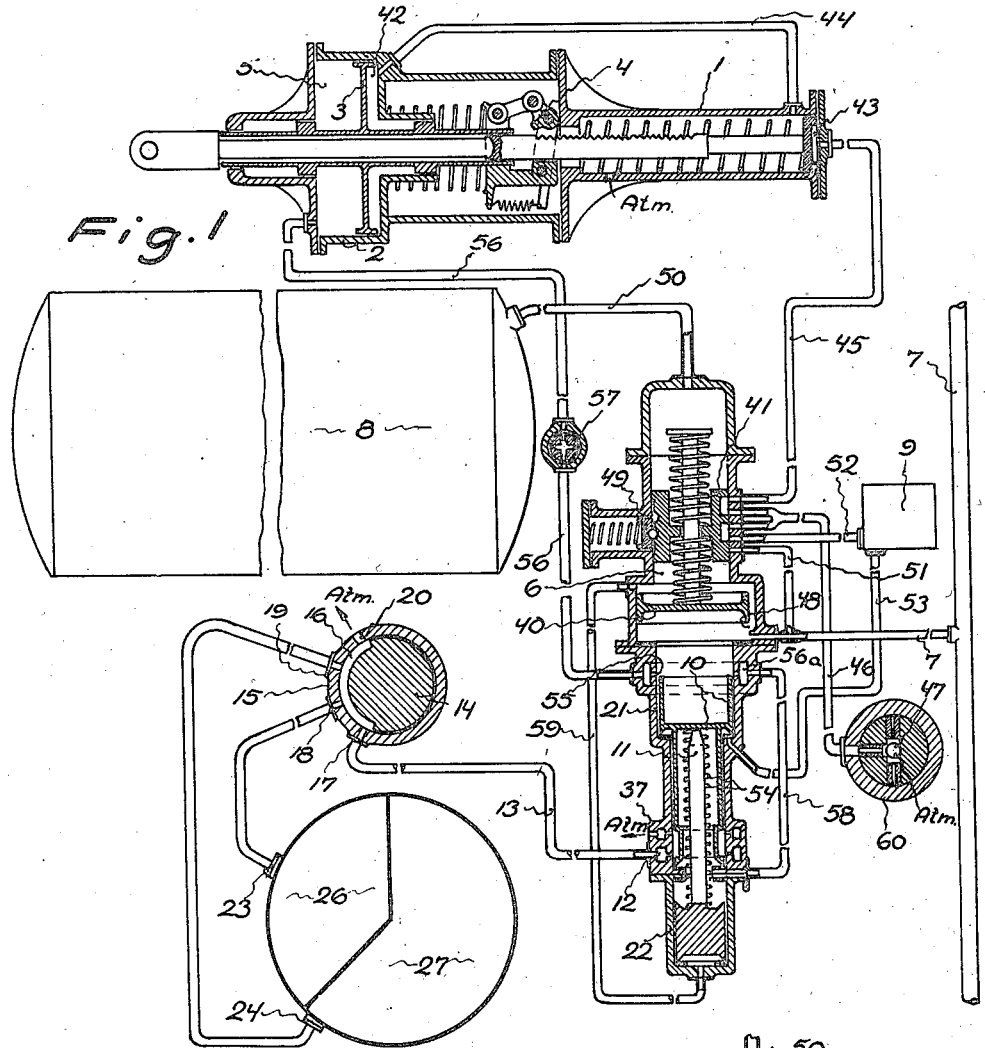
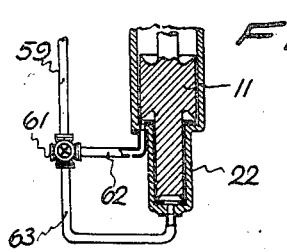
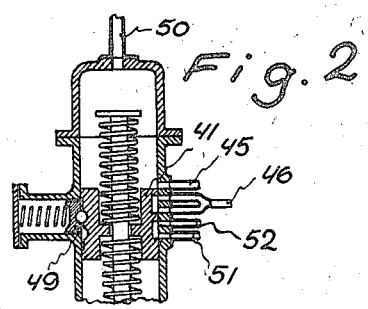
INVENTORS
A. ANDERBERG
E.A. ANDERBERG,
by Emil Brunnelyche
Attorney Patented Sept. 27, 1932

1,878,993

UNITED STATES PATENT OFFICE

ANDERS ANDERBERG AND ERIK ANDERS ANDERBERG, OF LUND, SWEDEN, ASSIGNORS TO CARL HOLMBERGS MEKANISKA VERKSTADS AKTIEBOLAG, OF LUND, SWEDEN, A CORPORATION OF SWEDEN

COMPRESSED AIR BRAKE FOR OBTAINING A VARIABLE BRAKING EFFECT

Application filed February 14, 1930, Serial No. 428,453, and in Sweden February 22, 1929.

In two-chamber compressed air brakes or modifications thereof the greatest braking effect, when braking, is obtained if the atmospheric pressure is at hand within the so called function chamber of the brake cylinder. If the brake is dimensioned for braking of a car of certain weight, for instance an empty freight car or a passenger car, special arrangements must be adhered to, especially in case of freight cars, for increasing the braking effect of the car when loaded. For this purpose it has previously been proposed to provide the car with a so called auxiliary brake, adapted for function when the car is loaded. Lately another and simpler means has also been proposed for the same purpose, and for such purpose the brake piston of the two-chamber brake has been carried out in the form of a differential piston, the different piston areas of which are intended to be set into action according to requirements for braking of an empty and half loaded car respectively, both of the piston areas coacting for braking of the fully loaded car.

It is evident, that the solution of the problem would be still further simplified in case it was possible by simple supplementary means to control the braking effect in such a manner that one and the same brake piston could be used for the braking of an empty as well as a half and fully loaded car, and in such case it would also be possible to obtain the result that one and the same type or system of brakes could be used both on passenger and on freight cars, a result which, of course, from several points of view would be highly desirable. The present invention forms a solution to the problem ensuring this result, and according to the invention it will be possible to use one and the same simple two-chamber brake piston for obtaining theoretically as many stages or different values of the braking effect as desired, although for all practical purposes it is entirely sufficient to obtain three such values.

As hinted at above, the maximal braking effect at a certain pressure in the train pipe will be obtained when reducing the pressure within the function chamber of the two-chamber brake to the value of the atmospheric, and it is evident that if the braking system could be constructed in such a manner that the pressure within the function chamber, in spite of the value of the decrease in pressure within the train pipe, is prevented from decreasing down to the value of the atmospheric pressure, the same brake would give a lesser value of the maximal braking effect. Besides, if the maximal decrease in pressure within the function chamber could be controlled so as to assume two or more different fixed values, it would also be possible to obtain two or more fixed values of the maximal braking effect, one value of the latter for each of the fixed values of the maximal decrease in pressure within the function chamber.—These are the principles forming the foundation of the present invention, and the desired result is obtained by means thereof that the function chamber, instead of being connected to the atmosphere for longer or shorter periods of time when braking, as has hitherto been the generally adopted practice, is set in connection with closed containers, the volume of which will be determining on the value of the maximal decrease of pressure within the said chamber.—These receptacles may either be of a different size and act independently of each other, or they may be of equal size and adapted to be set into action in one combination or the other for obtaining the desired variation of the total amount of the volume of the container in use in each case. Further, the construction is of such a kind that the said containers, as soon as the brakes are released by increasing the pressure within the train pipe, are connected with the atmosphere, in order that the same container shall again be ready for controlling the maximal decrease of pressure within the function chamber at the next braking operation.

In the following the invention is described with reference to the accompanying drawing, which shows the invention as adapted to a modified form of two-chamber compressed air brakes wherein the working chamber is set into communication with the atmosphere when the brake is released. This application of the invention is intended to show the possibility of using the same also in connection with this type of brakes, and it is clearly to be noted that the applicability of the invention is not limited to such type of brakes only. On the contrary, the invention is applicable in connection with all types of two-chamber compressed air brakes, as all of them have in common that it is the decrease in pressure within the function chamber, which determines the braking power and thereby also the braking effect.

In the drawing Fig. 1 shows diagrammatically the whole brake system, and it is to be noted that the different parts of the figure, for the sake of clearness, are drawn to different and disproportionate scales. Fig. 2 shows a detail of the triple-valve slide in braking position, and Fig. 3 shows a modified form of another detail.

The modified form of two-chamber compressed air brakes shown in the drawing comprises the combination of an approaching means for advancing the brake shoes in contact with the wheels when braking, said approaching means being carried out in the form of a single-chamber brake 1, and a two-chamber brake 2, the piston 3 of which by means of a connection device 4 acts on the same piston rod as the piston of the single-chamber brake, the working chamber of said two-chamber brake being connected to the atmosphere when the brake is released. The piston 3 of the two-chamber brake 2 is given the form of a differential piston having a smaller sized part and a larger sized part, both parts being rigidly connected to each other and tightened in the corresponding shaped cylinder against pressures in both directions.—This type of brake is known and forms no part of the invention itself, and it can be substituted by any type of two-chamber compressed air brakes whatever. By means of a control valve or triple valve structure 6 of known type, the function chamber 5 of the two-chamber brake is connected with the train pipe 7, the triple valve also in a known manner connecting the working chamber of the two-chamber brake with an auxiliary reservoir 8 for effecting a braking upon a decrease of pressure within the train pipe 7, the function chamber 5 of the brake being then ordinarily emptied, more or less, to the atmosphere by means of the triple valve.

According to the invention the triple valve 6 is connected with a transfer chamber 9 adapted for acceleration of the propagation of the decrease of pressure in the train pipe 7 in case of long trains, such arrangement being previously known per se. The triple-valve 6 is also combined with valve means 10, 11 adapted to cause the two-chamber brake 2, when braking, to act according to the braking curves characteristic to the single-chamber brake, to control the connection between the function chamber 5 and the aforesaid means and for controlling of the connection between said means and the atmosphere.

The general characteristic of the invention is that the emptying of the function chamber 5 by the intermediary of the valve means 10, 11 takes place into closed containers of a predetermined size when braking under conditions requiring a decreased braking effect, or to the atmosphere, when the maximal braking effect is to be utilized.

For this purpose the outlet 12 from the valve housing 21, or its equivalent, by means of a pipe 13 is connected with a four-way valve member which according to the embodiment diagrammatically shown in the drawing has been given the shape of a cock including the cock plug 14 and a housing 15 surrounding the same. The cock plug 14 is provided with a peripheral groove 16, and the housing 15 at a level therewith is provided with four radial channels 17, 18, 19 and 20. The channel 17 forms an inlet and is connected with the pipe 13, the channels 18 and 19 from outlets to different closed containers, and the channel 20 forms an outlet directly to the atmosphere. By means of the pipe 23 the channel 18 stands in connection with a container 26, and by means of a pipe 24 the channel 19 stands in connection with the container 27 which for instance can be twice the size of the first mentioned container.— In the position of the cock plug shown in the drawing, the pipe 13 is directly connected with the atmosphere by means of the channel 20, and thereby the maximal braking effect is naturally obtained in the usual manner, same as if the function chamber had been directly connected with the atmosphere by the valve means 11 and the port 37.

In this connection it is to be remarked that the invention is not limited to the use of a cock as the valve member 14, 15 described above, but the same function may naturally also be obtained by using any four-way valve member, for instance a slide valve or the like.

If the valve member is to take such a position that the channels 17 and 18 are interconnected only, the function chamber 5 will be emptied exclusively to the container 26, and since such container has a certain limited volume, the decrease of pressure within the function chamber can never proceed beyond a certain value, irrespective of how much the pressure within the train pipe 7 is decreased. This value of the final pressure within the function chamber can be assumed to correspond to a braking effect sufficient for the braking of an empty car.

If the valve member 14, 15 is changed over into a position in which the groove 16 interconnects the channels 17, 18 and 19, the total volume of the container is increased by the container 27, and a certain higher value of the maximal decrease of pressure in the function chamber 5 answers hereto, such value in its turn corresponding to a certain increased braking effect adapted for instance for the braking of a half loaded car. By the interconnection of the channels 17, 18, 19 and 20 a value of the braking effect corresponding to the braking of a fully loaded car is obtained in a similar manner. Hence, it is to be seen that by proper adjustment of the position of the valve member 14, 15 it will be possible to adapt the braking effect according to the weight of the car and the load in theoretically as many stages as desired (depending on the number of containers used and the number of "ways" is the valve member), but for all practical purposes the number of stages described above may be considered sufficient. The size or volume of the different containers is naturally adapted according to the differences between the values of the braking effect desired.

As stated above, the Fig. 1 shows the different members in the position taken when the brakes are released. When the brake system is loaded and the brakes are entirely released, and when using a pressure of for instance 5 atm. in the train pipe 7, the same pressure will thus be at hand also in the auxiliary air reservoir 8 and in the function chamber 5. Both sides of the control piston 40 of the triple valve will also be subjected to the same pressure, and same is the case with regard to the piston slide 10 (with the exception of the annular face of the same which by means of the channel 53 stands in connection with the transfer chamber 9), and to the piston 11. The atmospheric pressure is at hand in the working chamber 42 of the brake, and in the advancing cylinder chamber 43 by means of the channels 44, 45, the slide 41, the channel 46 and the port 47. In the position shown in the drawing the containers 26, 27 by means of the cock plug 14 stand in connection with the atmosphere through the port 20.

If, for instance, the cock plug 14 takes a position adapted for braking of a half loaded car, i. e. so that both of the chambers 26 and 27 are coupled to the pipe 13, the said chambers, in the position of loading and releasing of the brakes, would have been emptied by means of the pipe 13, the cavity within the slide 10 and the port 37. The transfer chamber 9 is evacuated by means of the slide 41, the channel 46 and the port 47.

A braking is effected in the ordinary manner by decreasing the pressure within the train pipe 7. Thereby the piston 40 is displaced for interrupting the connection between the train pipe and the auxiliary reservoir 8 (by means of the feed groove 48). By the displacement of the piston 40, the arresting means 49 are released in a manner known per se, and the slide 41 is suddenly displaced into the position shown in Fig. 2. Hereby the pressure within the auxiliary reservoir 8 by means of the channels 50 and 45 is transmitted to the advancing brake cylinder 43, so that the brake shoes are advanced towards the wheels. By the channel means 44 the pressure within the auxiliary reservoir is also transmitted to the working chamber 42 of the two-chamber brake. The stroke volume of the piston 40 is in a manner known per se eliminated by the transfer chamber 9, by the intermediary of the channel 51, the slide 41 and the channel 52.—The said pressure within the transfer chamber 9 by means of the channel 53 is transferred to the outer, annular face of the piston slide 10.

Hereby all of the faces of the piston slide 10 and the piston 11 will be subjected to substantially the same pressure, i. e. approximately the pressure within the train pipe at the moment in which the brake shoes are advanced into contact with the wheels.

Hereby the spring 54 is in position to displace the piston slide 10 for closing as well the connection 55 between the train pipe 7 and the function chamber 5 of the brake as well as the connection between the ports 12 and 37. The spring 54 advances the piston 11 its full stroke, which results in a new connection being established between the function chamber 5 and the pipe 13 by the intermediary of the channels 56, 58 and the port 12. From the pipe 13 the air is transmitted either to the atmosphere by the port 20, if the valve means 14, 15 is set into a position corresponding to a fully loaded car, or to the containers 26, 27, if said valve means are adjusted for a half loaded car, or finally to the container 26 only, if the valve means is adjusted for an empty car.

This transmission of air from the function chamber 5 into the pipe 13 is continued as long as the pressure within the function chamber is decreased (and thereby also as long as the pressure on the central area of the piston slide 10 acted upon by the spring 54 is decreased) so much that the train pipe pressure on the piston slide 10 is sufficient for carrying said slide 10 into its central or intermediate position, i. e. so that the channels 56, 58 are interrupted from the train pipe 7 at the ports 55, and connected with the pipe 13 at the port 12, the connection between the pipe 13 and the atmosphere at the port 37 being simultaneously broken. Hereby the decrease of pressure established within the function chamber 5 will not be changed. At a pressure of 5 atm. within the train pipe, when the brake system is fully loaded and the brakes are released, the decrease of pressure within the function chamber just described will be about 0,8–1,0 atm. and the whole function will be obtained as the result of a decrease of pressure within the train pipe amounting to about 0,25 atm.

The decrease of pressure within the function chamber results therein that the piston 3, belonging to the two-chamber brake, by means of the pressure emanating from the auxiliary reservoir 8, is advanced so far that the interconnection device 4 is set into action for interconnection of the brake pistons by means of the common toothed piston rod.

It will thus be understood that the effect of the brake as described above will be unvaried, and any certain braking effect will not be obtained, but the result is approximately a braking effect amounting to about 18% of an empty car, i. e. the amount needed for a rapid and efficient advance and contact of the braking shoes only.

Thereafter, if the train pipe pressure is further decreased for the purpose of obtaining a stronger braking effect, the piston slide 10 will again be displaced (upwardly) by means of both the pressure within the function chamber and the pressure emanating from the auxiliary reservoir 8 (by means of the channel 50, the triple valve 6 and the channel 59). Hereby the function chamber will be emptied by the channels 56, 58 and the port 12 to the pipe 13, until an equilibrium is obtained with regard to the train pipe pressure, and then the piston slide 10 is again displaced into its centre position, i. e. a position in which all of its channels are closed.

If the train pipe pressure is further decreased, the movements of the piston slide 10 are repeated, and the pressure within the function chamber 5 is still further decreased ensuring the result that the braking effect is correspondingly increased. Hence, it is evident that a full control is at hand during actual braking.

If it is intended that the braking power shall be reduced, the pressure within the train pipe 7 is increased again, and thereby the piston slide is displaced (downwardly) into the position shown in Fig. 1, whereby air from the train pipe by means of the ports 55 is admitted to the function chamber 5 by the intermediary of the channel 56.—This air transmission may be retarded more or less by means of a throttling means 56.—Simultaneously with the increase of pressure within the function chamber 5, the braking effect is naturally decreased.

If the valve means 14, 15 is set into a position adapted for braking of a half loaded car (both of the containers 26 and 27 being in use), the corresponding containers, during the brake release, will be connected with the atmosphere simultaneously with the loading of the function chamber 5, and the emptying of the said containers (26, 27) will go on until an equilibrium is established between the pressures in the train pipe and the auxiliary reservoir, so that the piston slide 10 is returned into its centre or intermediate position, in which all of the channels are closed.

If the braking power is intended to be still further reduced, such result will be obtainable by a further increase of the train pipe pressure, whereby the function described above will be repeated.—The release of the brakes may thus be performed gradually.

At a complete release of the brakes, the train pipe pressure is restored to the actual service value (5 atm. being assumed in the foregoing). Hereby the pressure within the function chamber will be increased up to the same value (5 atm.), and the triple valve control piston 40 will be displaced into the position shown in Fig. 1, in which the air at hand in the advancing device cylinder 43 is permitted to escape to the atmosphere by means of the channel 45, the slide 41, the channel 46 and the port 47.

This emptying process can be more or less retarded by the throttling device 60, and the throttling devices 60 and 57 may, of course, be carried out so as to act in synchronism or mechanically combined so as to take a corresponding position in relation to each other.

By means of the port 47 and the channel 46 the transfer chamber 9 is also evacuated.—The small quantity of air taken from the auxiliary reservoir 8 is replaced by means of the feed groove 48 in the common manner.

When the brake system is fully loaded and the brakes completely released, the piston slide 10 will always take the position shown in Fig. 1, as the surface of the piston slide 10 otherwise subjected to the pressure of the transfer chamber 9 is relieved from such pressure. If any or both of the containers 26 and 27 are in use, they are evacuated by the pipe 13 and the ports 12 and 37.

If the size of the surface of the member 11 is dimensioned in such a manner that a full braking effect in respect of a fully loaded car (i. e. when the function chamber 5 is connected with the atmosphere when braking) is obtained, for instance, when reducing the main pipe pressure from 5 atm., as assumed, down to 3,5 atm., a full braking effect will naturally be obtained for a higher pressure, in case the brake of the car in question is adjusted for braking of a half loaded car (for instance at a decrease down to 3,95 atm. only), and for a relatively slight decrease of pressure (for instance 4,35 atm.) in the train pipe only when the brake is adjusted for braking of an empty car.

If the member 22 is constructed in the manner shown in Fig. 3, i. e. so that the piston 11 is given the shape of a differential piston, the different areas of the same may, however, be calculated in such a manner that a full braking effect in any case is obtained for one and the same decrease of pressure within the train pipe, say for instance 3,5 atm.

When the brake is adjusted for braking of an empty car, the auxiliary reservoir pressure is transmitted by the channel 59, the reversing device 61 and the channel 62 to the outer annular face of the piston 11. Thereby the central face of the said piston is set out of action, as the same by means of the channel 63 and the reversing device 61 stands in connection with the atmosphere.

If the brake is adjusted for braking of a half loaded car, the central surface of the piston 11, by means of the channel 63 is set into connection with the channel 59, and the annular piston face by means of the channel 62 is connected with the atmosphere.

On the other hand, if the brake is adjusted for braking of a fully loaded car, both of the piston faces are set into action and connected with the channel 59.

It is evident, that the movable part 14 of the valve member 14, 15 may be manually adjusted according to the maximal braking effect desired for each separate car, i. e. the valve member may be manually adjusted according to the load on the car.

What we claim and desire to secure by Letters Patent is:—

1. In compressed air brakes, a brake structure comprising a brake chamber adapted to be kept under pressure when the brake is released, means for discharge of air from such chamber for the purpose of braking, a closed container, interconnection means for transmitting the air discharged from the brake chamber into said container, so that the volume of the same will be determining for the final pressure within said chamber, and means for interrupting the said interconnection and for connecting the container with the atmosphere when the brake is released.

2. In compressed air brakes, a brake structure comprising a brake chamber adapted to be kept under pressure when the brake is released, means for discharge of air from such chamber for the purpose of braking, a number of closed containers, interconnection means for transmitting the air discharged from the brake chamber into said containers, means for coupling said containers separately to the said interconnection means according to will, so that the container volume in use will be determining for the final pressure within the brake chamber, and means for interrupting the said interconnection and for connecting the containers with the atmosphere when the brake is released.

3. In compressed air brakes according to claim 2, wherein the containers are two in number and of different volume.

4. In compressed air brakes, a two-chamber compressed air brake structure comprising a function chamber adapted to be kept under pressure when the brake is released, means for discharge of air from said function chamber for the purpose of braking, a closed container, interconnection means for transmitting the air discharged from the function chamber into said container, so that the volume of the same will be determining for the final pressure within the function chamber, and means for interrupting the said interconnection and for connecting the container with the atmosphere when the brake is released.

5. In compressed air brakes, a two-chamber compressed air brake structure comprising a function chamber adapted to be kept under pressure when the brake is released, means for discharge of air from said function chamber for the purpose of braking, a number of closed containers, interconnection means for transmitting the air discharged from the function chamber into said containers, means for coupling said containers separately to the said interconnection means according to will, so that the container volume in use will be determining for the final pressure within the function chamber, and means for interrupting the said interconnection and for connecting the containers with the atmosphere when the brake is released.

6. In two-chamber compressed air brakes according to claim 5, wherein the containers are two in number and of different volume.

7. In compressed air brakes, a brake structure comprising a brake chamber adapted to be kept under pressure when the brake is released, means for discharge of air from such chamber for the purpose of braking, a closed container, interruptable interconnection means for transmitting the air discharged from the brake chamber into said container, a train pipe adapted to be kept under normal service pressure when the brake is released, an automatically acting valve means controlled by the train pipe pressure and adapted for establishing the aforesaid interconnection, when the train pipe pressure is decreased for the purpose of braking, and for connecting the container with the atmosphere simultaneously with the interruption of the interconnection, when the train pipe pressure is increased again for releasing the brake.

8. In compressed air brakes, a brake structure comprising a brake chamber adapted to be kept under pressure when the brake is released, means for discharge of air from such chamber for the purpose of braking, a number of closed containers, interruptable interconnection means for transmitting the air discharged from the brake chamber into said containers, means for coupling said containers separately to the said interconnection means according to will, a train pipe adapted to be kept under normal service pressure when the brake is released, an automatically acting valve means controlled by the train pipe pressure and adapted for establishing the aforesaid interconnection, when the train pipe pressure is decreased for the purpose of braking, and for connecting the containers with the atmosphere simultaneously with the interruption of the interconnection, when the train pipe pressure is increased again for releasing the brake.

9. In compressed air brakes, a two-chamber compressed air brake structure comprising a function chamber adapted to be kept under normal service pressure when the brake is released, means for discharge of air from said function chamber for the purpose of braking, a number of closed containers, interruptable interconnection means for transmitting the air discharged from the function chamber into said containers, means for coupling said containers separately to said interconnection means according to will, a train pipe adapted to be kept under the same pressure as the function chamber when the brake is released, an automatically acting valve means controlled by the train pipe pressure and adapted for establishing the aforesaid interconnection, when the train pipe pressure is decreased for the purpose of braking, and for connecting the containers with the atmosphere simultaneously with the interruption of the interconnection, when the train pipe pressure is increased again for releasing the brake.

10. In two-chamber compressed air brakes according to claim 9, wherein the containers are two in number and of different volume.

11. In two-chamber compressed air brakes according to claim 9, wherein the means for coupling the containers separately to the interconnection means consists of a movable valve member adapted for coupling in the containers in succession and at a final stage of movement in the same direction to connect them all with the atmosphere.

12. In two-chamber compressed air brakes according to claim 9, comprising an adjustable throttling means is inserted in the interconnection means between the function chamber of the brake and the automatically acting valve means for connecting the same with the containers.

In testimony whereof we have signed our names to this specification.

ANDERS ANDERBERG.
ERIK ANDERS ANDERBERG.